(12) United States Patent
Butcher

(10) Patent No.: US 7,191,148 B1
(45) Date of Patent: Mar. 13, 2007

(54) METHOD FOR STRUCTURING A STATE REVOLVING FUND BOND PROGRAM

(75) Inventor: George H. Butcher, New Rochelle, NY (US)

(73) Assignee: Goldman Sachs & Co., New York, NY (US)

(*) Notice: Subject to any disclaimer, the term of this patent is extended or adjusted under 35 U.S.C. 154(b) by 1191 days.

(21) Appl. No.: 09/920,880

(22) Filed: Aug. 2, 2001

Related U.S. Application Data

(60) Provisional application No. 60/255,977, filed on Dec. 15, 2000.

(51) Int. Cl.
*G06Q 40/00* (2006.01)

(52) U.S. Cl. .......................... 705/35; 705/36

(58) Field of Classification Search ............ 705/35–38, 705/14; 370/230
See application file for complete search history.

(56) References Cited

U.S. PATENT DOCUMENTS 4,739,478 A * 4/1988 Roberts et al. ........... 705/36 R

OTHER PUBLICATIONS

J.G. Taylor "College Revenue Bonds to Finance Self-Supporting Projects", The University of Texas, The Journal of Finance, vol. 4, No. 4 (Dec. 1949), 328-341.*

Kinnander, Ola "Mr. Smith Leaves Washington and Reflects on Public financing. (Interview)", Bond Buyer, 330, 30791, 6, Dec. 20, 1999.*

* cited by examiner

*Primary Examiner*—Frantzy Poinvil
*Assistant Examiner*—Harish T. Dass
(74) *Attorney, Agent, or Firm*—Greenberg Traurig, LLP

(57) ABSTRACT

A method for structuring a state revolving fund bond program. More particularly, a method for structuring a state revolving fund bond program including an SRF fund with program equity, at least one loan made to a borrower, and at least one bond issued to a bondholder corresponding to the loan made to the borrower, comprising: receiving, into the SRF fund, loan repayments made by the borrower; and paying bond debt service with the loan repayments made by the borrower and, to the extent required, from program equity and earnings thereon.

14 Claims, 11 Drawing Sheets

Fig 6

| Year | Reserve Fund Cash Flows ||| Escrow Fund Cash Flows |||
|---|---|---|---|---|---|---|
| | Reserve Fund Balance | De-allocated Equity | Reserve Earnings Available to Fund Interest Subsidy | Equity Applied to Fund Subsidy | Earnings Available to Fund Subsidy | Annual Interest Subsidy |
| 1 | 33,000,000 | 1,039,851 | 1,521,300 | 916,492 | 604,808 | 1,521,300 |
| 2 | 31,960,149 | 1,087,788 | 1,473,363 | 910,806 | 562,557 | 1,473,363 |
| 3 | 30,872,361 | 1,137,935 | 1,423,216 | 902,647 | 520,569 | 1,423,216 |
| 4 | 29,734,425 | 1,190,394 | 1,370,757 | 891,800 | 478,957 | 1,370,757 |
| 5 | 28,544,031 | 1,245,271 | 1,315,880 | 878,035 | 437,845 | 1,315,880 |
| 6 | 27,298,760 | 1,302,678 | 1,258,473 | 861,105 | 397,368 | 1,258,473 |
| 7 | 25,996,082 | 1,362,732 | 1,198,419 | 840,749 | 357,671 | 1,198,419 |
| 8 | 24,633,350 | 1,425,554 | 1,135,597 | 816,685 | 318,912 | 1,135,597 |
| 9 | 23,207,796 | 1,491,272 | 1,069,879 | 788,616 | 281,263 | 1,069,879 |
| 10 | 21,716,525 | 1,560,019 | 1,001,132 | 756,224 | 244,908 | 1,001,132 |
| 11 | 20,156,505 | 1,631,936 | 929,215 | 719,169 | 210,046 | 929,215 |
| 12 | 18,524,569 | 1,707,168 | 853,983 | 677,090 | 176,892 | 853,983 |
| 13 | 16,817,400 | 1,785,869 | 775,282 | 629,604 | 145,678 | 775,282 |
| 14 | 15,031,532 | 1,868,198 | 692,954 | 576,300 | 116,654 | 692,954 |
| 15 | 13,163,334 | 1,954,321 | 606,830 | 516,743 | 90,086 | 606,830 |
| 16 | 11,209,013 | 2,044,416 | 516,735 | 450,471 | 66,264 | 516,735 |
| 17 | 9,164,597 | 2,138,663 | 422,488 | 376,990 | 45,498 | 422,488 |
| 18 | 7,025,934 | 2,237,256 | 323,896 | 295,777 | 28,118 | 323,896 |
| 19 | 4,788,678 | 2,340,393 | 220,758 | 206,275 | 14,483 | 220,758 |
| 20 | 2,448,285 | 2,448,285 | 112,866 | 107,892 | 4,974 | 112,866 |
| Total | | 33,000,000 | 18,223,022 | 13,119,470 | 5,103,552 | 18,223,022 |

Fig. 8

| Year | Debt Service on 0% Loans | Bond Principal | Bond Coupon | Bond Interest | Bond Debt Service | Purchase Price Less Recycled Equity | Earnings | Original Equity Release | Additional Equity Release | Ending Balance |
|---|---|---|---|---|---|---|---|---|---|---|
| 1 | $5,000,000 | $2,104,798 | 3.100% | $2,895,202 | $5,000,000 | $62,932,077 | $3,838,857 | $5,000,000 | $531,330 | $61,239,504 |
| 2 | 5,000,000 | 2,170,047 | 3.750% | 2,829,953 | 5,000,000 | 61,239,504 | 3,735,616 | 5,000,000 | 531,330 | 59,443,889 |
| 3 | 5,000,000 | 2,251,424 | 3.810% | 2,748,576 | 5,000,000 | 59,443,889 | 3,626,077 | 5,000,000 | 531,330 | 57,538,636 |
| 4 | 5,000,000 | 2,337,203 | 3.900% | 2,662,797 | 5,000,000 | 57,538,636 | 3,509,857 | 5,000,000 | 531,330 | 55,517,162 |
| 5 | 5,000,000 | 2,428,354 | 3.960% | 2,571,646 | 5,000,000 | 55,517,162 | 3,386,547 | 5,000,000 | 531,330 | 53,372,379 |
| 6 | 5,000,000 | 2,524,517 | 4.020% | 2,475,483 | 5,000,000 | 53,372,379 | 3,255,715 | 5,000,000 | 531,330 | 51,096,763 |
| 7 | 5,000,000 | 2,626,002 | 4.100% | 2,373,998 | 5,000,000 | 51,096,763 | 3,116,903 | 5,000,000 | 531,330 | 48,682,336 |
| 8 | 5,000,000 | 2,733,668 | 4.190% | 2,266,332 | 5,000,000 | 48,682,336 | 2,969,622 | 5,000,000 | 531,330 | 46,120,628 |
| 9 | 5,000,000 | 2,848,209 | 4.280% | 2,151,791 | 5,000,000 | 46,120,628 | 2,813,358 | 5,000,000 | 531,330 | 43,402,656 |
| 10 | 5,000,000 | 2,970,112 | 4.380% | 2,029,888 | 5,000,000 | 43,402,656 | 2,647,562 | 5,000,000 | 531,330 | 40,518,887 |
| 11 | 5,000,000 | 3,100,203 | 4.510% | 1,899,797 | 5,000,000 | 40,518,887 | 2,471,852 | 5,000,000 | 531,330 | 37,459,209 |
| 12 | 5,000,000 | 3,240,022 | 4.610% | 1,759,978 | 5,000,000 | 37,459,209 | 2,285,012 | 5,000,000 | 531,330 | 34,212,890 |
| 13 | 5,000,000 | 3,389,388 | 4.710% | 1,610,612 | 5,000,000 | 34,212,890 | 2,086,986 | 5,000,000 | 531,330 | 30,768,546 |
| 14 | 5,000,000 | 3,549,028 | 4.810% | 1,450,972 | 5,000,000 | 30,768,546 | 1,876,881 | 5,000,000 | 531,330 | 27,114,097 |
| 15 | 5,000,000 | 3,719,736 | 4.890% | 1,280,264 | 5,000,000 | 27,114,097 | 1,653,960 | 5,000,000 | 531,330 | 23,236,727 |
| 16 | 5,000,000 | 3,901,631 | 4.980% | 1,098,369 | 5,000,000 | 23,236,727 | 1,417,440 | 5,000,000 | 531,330 | 19,122,837 |
| 17 | 5,000,000 | 4,095,932 | 5.040% | 904,068 | 5,000,000 | 19,122,837 | 1,166,493 | 5,000,000 | 531,330 | 14,757,999 |
| 18 | 5,000,000 | 4,302,367 | 5.090% | 697,633 | 5,000,000 | 14,757,999 | 900,238 | 5,000,000 | 531,330 | 10,126,907 |
| 19 | 5,000,000 | 4,521,358 | 5.140% | 478,642 | 5,000,000 | 10,126,907 | 617,741 | 5,000,000 | 531,330 | 5,213,318 |
| 20 | 5,000,000 | 4,753,755 | 5.180% | 246,245 | 5,000,000 | 5,213,318 | 318,012 | 5,000,000 | 531,330 | 0 |
|  | $100,000,000 | $63,567,755 |  | $36,432,245 | $100,000,000 |  | $47,694,530 | $100,000,000 | $10,626,608 |  |
|  |  | $635,678 | Less Transaction Cost |  |  |  | PV of Additional Equity Released | $6,695,151 |  |  |
|  |  | $62,932,077 | Purchase Price |  |  |  | Gross Increase in Equity | $10,626,608 |  |  |

Assumptions
- $100 million of equity invested in 0% loans
- Bonds to finance loan purchase issued at 4.77%
- Transaction cost equal to 1%

Fig 10

|  | Loan Sale | Bond Refunding | Total |
|---|---|---|---|
| Bond Par | $456.9 MM | $1,657.2 MM | $2,114.0 MM |
| Loan Par | $630.4 MM | — | $630.4 MM |
| Gross Savings | $46.3 MM | $129.3 MM | $175.6 MM |
| % Gross Savings of Refunding Par | 10.1% | 7.8% | 8.3% |
| PV Savings | $36.4 MM | $29.7 MM | $66.1 MM |
| % Savings of Refunding Par | 8.0% | 1.8% | 3.1% |

Interest Rate Sensitivity of Savings

Additional earnings determined by the *difference* between the taxable investment rate and the arbitrage yield on bonds issued to finance loan purchase.

The two rates tend to move together.

➡ NOT SENSITIVE TO INTEREST RATE LEVELS

Savings determined by refunding bond yield.

➡ SENSITIVE TO INTEREST RATE LEVELS

METHOD FOR STRUCTURING A STATE REVOLVING FUND BOND PROGRAM

CROSS-REFERENCE TO RELATED APPLICATIONS

This application is a Continuation-In-Part of U.S. Provisional Application Ser. No. 60/255,977 filed Dec. 15, 2000.

FIELD OF THE INVENTION

The present invention relates to a method for structuring a state revolving fund bond program. More particularly, the present invention relates to a method for structuring a state revolving fund bond program including an SRF fund with program equity, at least one loan made to a borrower, and at least one bond issued to a bondholder corresponding to the loan made to the borrower, comprising: receiving, into the SRF fund, loan repayments made by each borrower; and paying bond debt service with the loan repayments made by each borrower and, to the extent required, from program equity and earnings thereon.

For the purposes of the present application the term "limited recourse general obligation" is intended to include, but not be limited to, an obligation: (a) in which recourse is limited to program equity in a state revolving fund; and (b) in which all or a portion of such available recourse is required to be used to meet the liabilities of the obligation but no program equity funds are legally pledged (e.g., for tax or other purposes) to secure the state revolving fund prior to a time when needed.

Further, for the purposes of the present application the term "sinking fund" is intended to include, but not be limited to, a fund expected to be used to pay debt service.

Further still, for the purposes of the present application the term "pledged fund" is intended to include, but not be limited to, a fund which is reasonably assured to be available.

Further still, for the purposes of the present application the terms "program equity" and "corpus allocation" are intended to include, but not be limited to, equity derived from capitalization grants and/or state matching funds. The equity may be in the form of loans and or cash (e.g., negotiable notes, security investments, etc.).

BACKGROUND OF THE INVENTION

In a State Revolving Fund ("SRF") program bonds are issued through an associated SRF issuer. FIG. 1 shows the structure of a conventional SRF program. As seen in this Fig., the bond proceeds are used to make loans to borrowers. Bond debt is serviced by: a) loan repayments from the borrowers; b) net interest subsidy (or "additional subsidy") from an interest subsidy fund (which may be in the form of "contract assistance" from one or more State General Obligation bonds or appropriations); and c) interest earnings from a reserve fund. The reserve fund is funded by equity from the SFR fund and the equity is returned to the SRF fund as principal is retired.

While conventional SRF programs using the reserve fund model typically achieve high ratings (e.g., "AAA"), such SRF programs are generally required (e.g., under Federal law) to restrict the yield on program equity in the reserve fund to the bond yield. This is due to the fact that the earnings on the reserve fund are used to pay debt service and that the reserve fund is pledged as security for the payment of the debt service. In other words, SRF program equity in the reserve fund is both a pledged fund and a sinking fund and as such the earnings on the reserve fund must generally be restricted to the arbitrage yield of the bonds which they secure. Of note, in order to maintain the tax exempt status of bonds issued under such a conventional SRF program, any yield on program equity in the reserve fund greater than the bond yield must be turned over to the Federal government. Conventional SRF programs using the cash flow model typically invest their program equity directly in loans, that has a similar economic effect to borrowing to fund those same loans and investing the equity at the bond yield.

BRIEF DESCRIPTION OF THE DRAWINGS

FIG. 6 shows a cash flow comparison according to an embodiment of the instant invention;

FIG. 8 shows various financial data in connection with 0% loans according to an embodiment of the instant invention;

FIG. 10 shows possible savings according to an embodiment of the instant invention.

Figure 1:
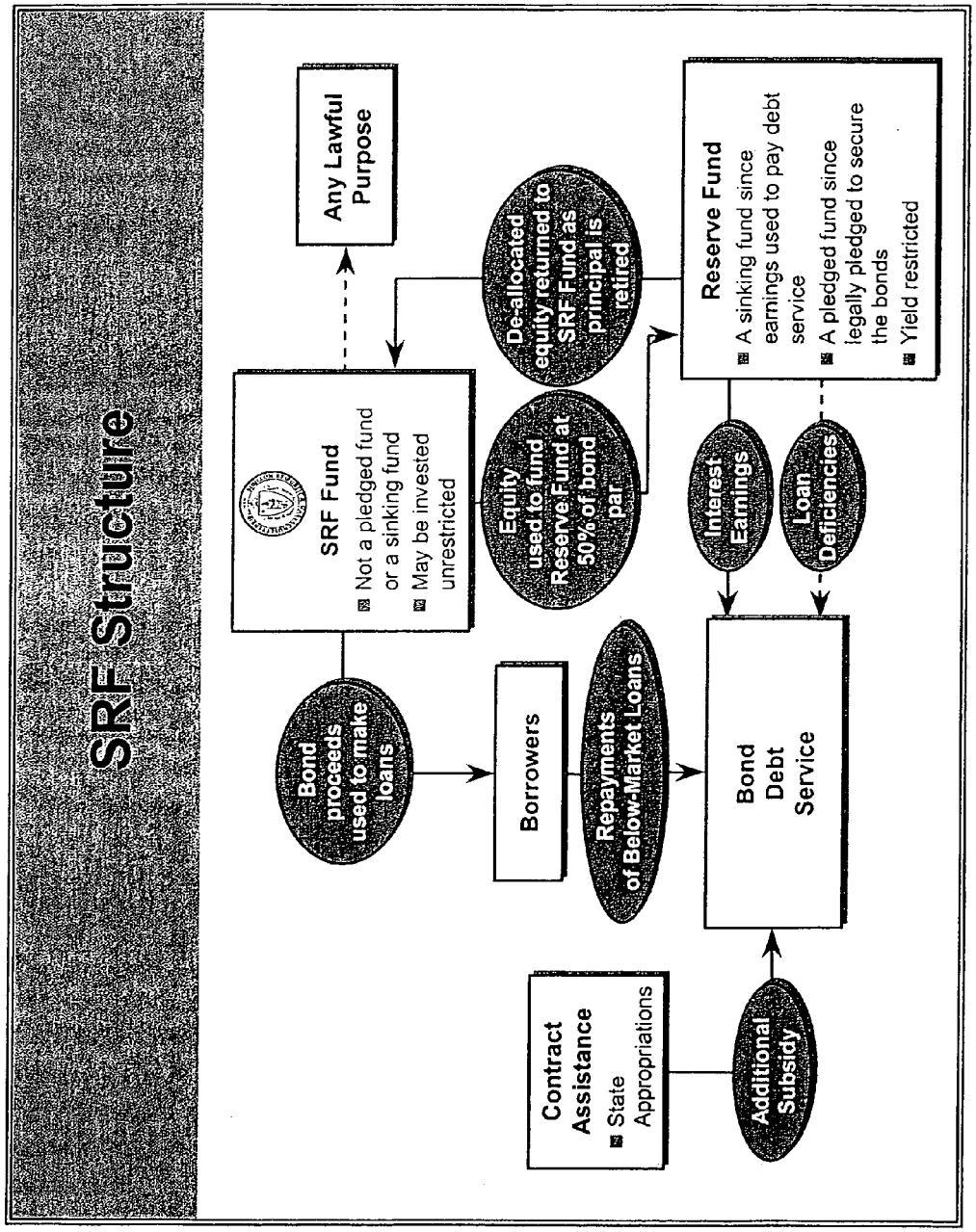
FIG. 1 shows a block diagram of a traditional SRF structure using the reserve fund model.

Among those benefits and improvements that have been disclosed, other objects and advantages of this invention will become apparent from the following description taken in conjunction with the accompanying figures. The figures constitute a part of this specification and include exemplary embodiments of the instant invention and illustrate various objects and features thereof.

DETAILED DESCRIPTION OF THE INVENTION

As required, detailed embodiments of the instant invention are disclosed herein; however, it is to be understood that the disclosed embodiments are merely illustrative of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the instant invention.

In one embodiment of the present invention a method for structuring a state revolving fund bond program including at least one bond is provided, comprising: primarily securing each bond associated with the state revolving fund bond program by a pledge of borrower loan payments; secondarily securing each bond associated with the state revolving fund bond program by a limited recourse general obligation;

and excluding program equity from being available to meet the limited recourse general obligation.

In one specific example, which example is intended to be illustrative and not restrictive, the step of excluding program equity from being available to meet the limited recourse general obligation may further comprise excluding program equity from being available to meet the limited recourse general obligation until at least a portion of the program equity has been de-allocated, after which the de-allocated portion of the program equity may be made available to meet the limited recourse general obligation. The portion of the program equity may be de-allocated on the date on which a loan payment associated with a given loan is due. The portion of the program equity may be de-allocated regardless of whether the loan payment associated with the given loan is actually made.

In another specific example, which example is intended to be illustrative and not restrictive, earnings from the program equity may be paid to a borrower associated with a given loan. The earnings from the program equity may be paid to the borrower on a periodic basis. A periodic payment of the earnings from the program equity may be made to the borrower after a loan payment associated with the given loan is due. The periodic payment of earnings from the program equity may be made to the borrower regardless of whether the loan payment associated with the given loan is actually made. The earnings from the program equity may be paid to the borrower in advance. The earnings from the program equity may be paid to the borrower in advance in an amount substantially equal to a present value of the expected earnings. The present value of the expected earnings may be calculated using an expected yield.

In another specific example, which example is intended to be illustrative and not restrictive, a lien may be granted on the de-allocated portion of the program equity. The lien may be superior to the availability of the de-allocated portion of the program equity to meet the limited recourse general obligation.

In another specific example, which example is intended to be illustrative and not restrictive, the state revolving fund bond program may be structured in connection with an initial financing.

In another specific example, which example is intended to be illustrative and not restrictive, the state revolving fund bond program may be structured in connection with a refunding.

In another embodiment of the present invention a method for structuring a state revolving fund bond program including at least one bond is provided, comprising: primarily securing each bond associated with the state revolving fund bond program by a pledge of borrower loan payments; secondarily securing each bond associated with the state revolving fund bond program by a limited recourse general obligation; and excluding a corpus allocation corresponding to each loan from being available to meet the limited recourse general obligation.

In another specific example, which example is intended to be illustrative and not restrictive, the step of excluding a corpus allocation corresponding to each loan from being available to meet the limited recourse general obligation may further comprise excluding a corpus allocation corresponding to each loan from being available to meet the limited recourse general obligation until at least a portion of the corpus allocation has been de-allocated, after which the de-allocated portion of the corpus allocation may be made available to meet the limited recourse general obligation. The portion of the corpus allocation corresponding to a given loan may be de-allocated on the date on which a loan payment associated with the given loan is due. The portion of the corpus allocation corresponding to the given loan may be de-allocated regardless of whether the loan payment associated with the given loan is actually made.

In another specific example, which example is intended to be illustrative and not restrictive, earnings from the corpus allocation corresponding to a given loan may be paid to a borrower associated with the given loan. The earnings from the corpus allocation corresponding to the given loan may be paid to the borrower on a periodic basis. A periodic payment of the earnings from the corpus allocation corresponding to the given loan may be made to the borrower after a loan payment associated with the given loan is due. The periodic payment of earnings from the corpus allocation corresponding to the given loan may be made to the borrower regardless of whether the loan payment associated with the given loan is actually made. The earnings from the corpus allocation corresponding to the given loan may be paid to the borrower in advance. The earnings from the corpus allocation corresponding to the given loan may be paid to the borrower in advance in an amount substantially equal to a present value of the expected earnings. The present value of the expected earnings may be calculated using an expected yield.

In another specific example, which example is intended to be illustrative and not restrictive, a lien may be granted on the de-allocated portion of the corpus allocation of a given loan. The lien may be superior to the availability of the de-allocated portion of the corpus allocation to meet the limited recourse general obligation.

In another specific example, which example is intended to be illustrative and not restrictive, the state revolving fund bond program may be structured in connection with an initial financing.

In another specific example, which example is intended to be illustrative and not restrictive, the state revolving fund bond program may be structured in connection with a refunding.

In another embodiment of the present invention a method for structuring a state revolving fund bond program including an SRF fund with program equity, at least one loan made to a borrower, and at least one bond issued to a bondholder corresponding to the loan made to the borrower is provided, comprising: receiving, into the SRF fund, loan repayments made by each borrower; and paying bond debt service with the loan repayments made by each borrower and, to the extent required, from program equity and earnings thereon.

In one specific example, which example is intended to be illustrative and not restrictive, the method may further comprise securing payment of bond debt service with at least one of: (i) at least one loan; and (ii) a limited recourse general obligation associated with the SRF fund.

In another specific example, which example is intended to be illustrative and not restrictive, the method may further comprise retaining at least a portion of the program equity in cash, which portion of the program equity retained as cash does not constitute a pledged fund or a sinking fund and can thus be invested at an essentially unrestricted yield.

In another specific example, which example is intended to be illustrative and not restrictive, the state revolving fund bond program may further include an interest subsidy fund and at least a portion of an interest subsidy from the interest subsidy fund may be used to pay bond debt service along with loan repayments before bond debt service is paid under the limited recourse general obligation.

In another specific example, which example is intended to be illustrative and not restrictive, the state revolving fund bond program may further include an equity funded subsidy escrow and at least a portion of an interest subsidy from the equity funded subsidy escrow may be used to pay bond debt service along with loan repayments before bond debt service is paid under the limited recourse general obligation. The equity funded subsidy escrow may be used to pay bond debt service on less than all of the loans in the state revolving fund bond program. Each loan in the state revolving fund bond program for which debt service is paid by the equity funded subsidy escrow may be payable from a guaranteed investment contract. Each loan in the state revolving fund bond program for which debt service is paid by the equity funded subsidy escrow may have a lower priority to at least one of (a) repayments made by the borrowers and (b) the limited recourse general obligation associated with the SRF fund than does each loan in the state revolving fund bond program for which debt service is not paid by the equity funded subsidy escrow. A bond corresponding to a loan in the state revolving fund bond program for which debt service is not paid by the equity funded subsidy escrow may be issued as a variable rate bond. The equity funded subsidy escrow may be funded at least in part from a portion of program equity corresponding to a given loan. The portion of the program equity corresponding to the given loan which is used to fund the equity funded subsidy escrow may be expended with interest to provide the interest subsidy. The portion of the program equity corresponding to the given loan which is used to fund the equity funded subsidy escrow may be yield restricted. A portion of the program equity corresponding to a given loan which is not used to fund the equity funded subsidy escrow may be yield unrestricted.

In another specific example, which example is intended to be illustrative and not restrictive, when the state revolving fund bond program includes at least two bonds the bond debt service of a given bond secured under the limited recourse general obligation associated with the SRF fund may be secured at one of at least two priority levels.

In another specific example, which example is intended to be illustrative and not restrictive, the state revolving fund bond program may be structured in connection with an initial financing.

In another specific example, which example is intended to be illustrative and not restrictive, the state revolving fund bond program may be structured in connection with a refunding.

In another embodiment of the present invention a method for structuring a state revolving fund bond program including an SRF fund with program equity, an interest subsidy fund, an equity funded subsidy escrow, at least one loan made to a borrower, and at least one bond issued to a bondholder corresponding to the loan made to the borrower is provided, comprising: receiving, into the SRF fund, loan repayments made by each borrower; and paying bond debt service with loan repayments made by each borrower, at least a portion of an interest subsidy from the interest subsidy fund, at least a portion of an interest subsidy from the equity funded subsidy escrow, and, to the extent required, from program equity and earnings thereon.

In one specific example, which example is intended to be illustrative and not restrictive, the method may further comprise securing payment of bond debt service with at least one of: (i) at least one loan; and (ii) a limited recourse general obligation associated with the SRF fund.

In another specific example, which example is intended to be illustrative and not restrictive, the method may further comprise retaining at least a portion of the program equity in cash, which portion of the program equity retained as cash does not constitute a pledged fund or a sinking fund and can thus be invested at an essentially unrestricted yield.

In another specific example, which example is intended to be illustrative and not restrictive, the equity funded subsidy escrow may be used to pay bond debt service on less than all of the loans in the state revolving fund bond program. Each loan in the state revolving fund bond program for which debt service is paid by the equity funded subsidy escrow may be payable from a guaranteed investment contract. Each loan in the state revolving fund bond program for which debt service is paid by the equity funded subsidy escrow may have a lower priority to at least one of (a) repayments made by the borrowers and (b) the limited recourse general obligation associated with the SRF find than does each loan in the state revolving fund bond program for which debt service is not paid by the equity funded subsidy escrow. A bond corresponding to a loan in the state revolving fund bond program for which debt service is not paid by the equity funded subsidy escrow may be issued as a variable rate bond. The equity funded subsidy escrow may be funded at least in part from a portion of program equity. The portion of the program equity which is used to fund the equity funded subsidy escrow may be expended with interest to provide the interest subsidy. The portion of the program equity which is used to fund the equity funded subsidy escrow may be yield restricted. A portion of the program equity which is not used to fund the equity funded subsidy escrow may be yield unrestricted.

In another specific example, which example is intended to be illustrative and not restrictive, when the state revolving fund bond program includes at least two bonds the bond debt service of a given bond secured under the limited recourse general obligation associated with the SRF fund may be secured at one of at least two priority levels.

In another specific example, which example is intended to be illustrative and not restrictive, the state revolving fund bond program may be structured in connection with an initial financing.

In another specific example, which example is intended to be illustrative and not restrictive, the state revolving fund bond program may be structured in connection with a refunding.

In summary, a first embodiment of the instant invention may operate as follows. An SRF program may be structured to achieve unrestricted earnings on at least a portion of program equity (e.g., by retaining at least a portion of program equity that is not used to make a loan and is not part of a pledged fund or a sinking fund). Such an SRF program shall hereinafter be referred to as a State Revolving Fund General Obligation ("SRFGO") program. More particularly, the structure of an SRFGO program according to the first embodiment of the instant invention is shown in FIG. 2.

Figure 2:
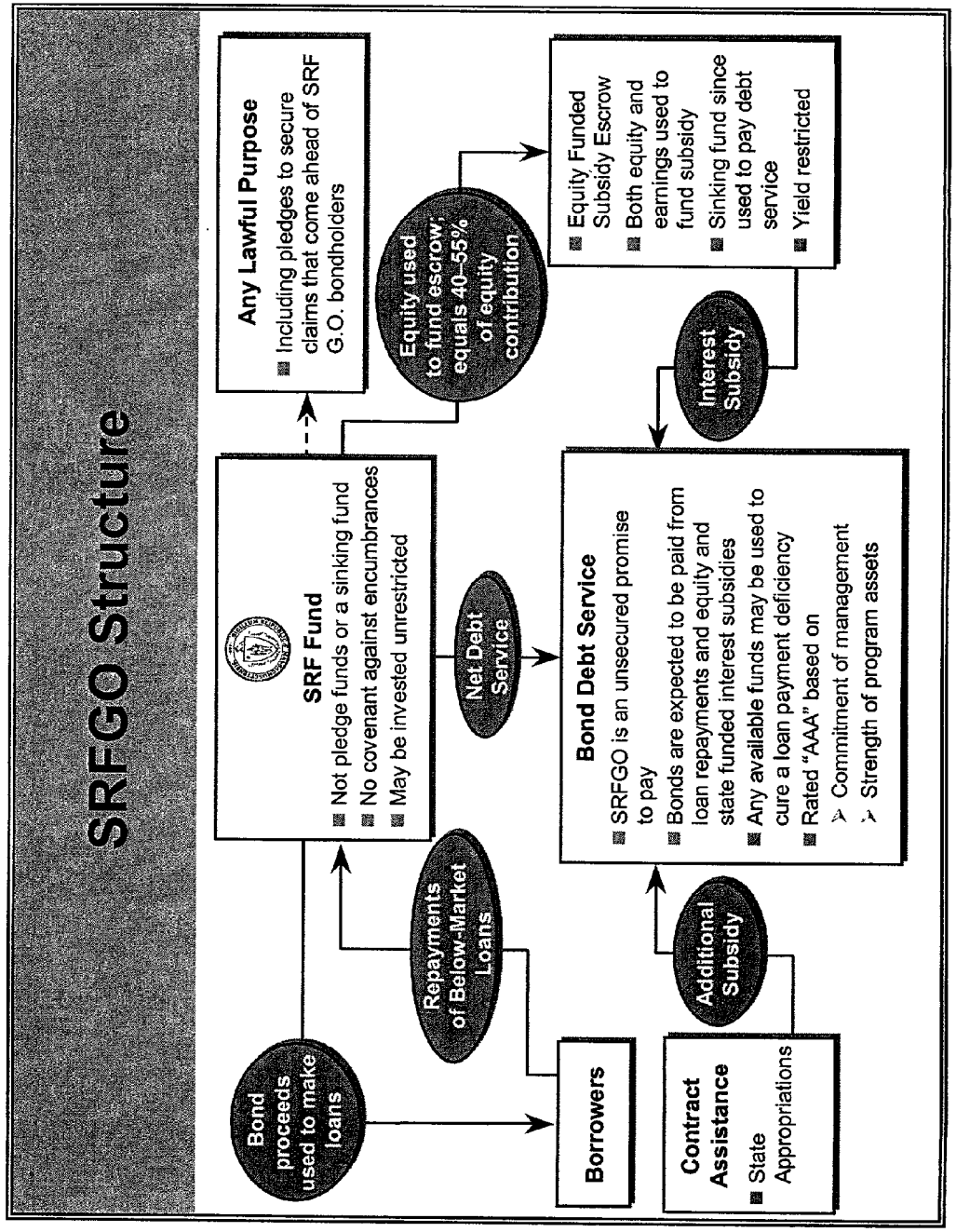
FIG. 2 shows a block diagram of an SRF structure according to an embodiment of the instant invention.

As seen in FIG. 2, the bond proceeds are used to make loans to borrowers. Borrower repayments are returned directly to the SRF fund. Bond debt is serviced by: a) net interest subsidy (or "additional subsidy") from an interest subsidy fund (which may be in the form of "contract assistance" from one or more State General Obligation bonds or appropriations); b) interest subsidy from an escrow; and c) net debt service from the SRF fund. The escrow is funded by equity from the SRF Fund (at x % of bond par, wherein x is an appropriate %, such as 40–55%, for example). The % of bond par that remains in the SRF fund is unrestricted.

Under the SRFGO program structure of the instant invention, the bonds would be primarily secured by a pledge of borrower loan payments but would not be secured by the borrowers' corpus (i.e., reserve fund) allocations. In the event of a borrower default, the borrower's corpus allocation would not be available to pay the SRF issuer's bond debt service. In any case, the bonds would additionally be secured by a limited recourse general obligation of the SRF issuer to pay the bonds from available SRF program funds in the event of a borrower default. Corpus allocations to borrowers would be specifically excluded from being available to meet the SRF general obligations until de-allocated. The corpus allocations would be invested for the benefit of the borrowers as required by any appropriate SRF statute for leveraged loans. Each borrower's corpus allocation could be reduced (i.e., de-allocated) on each of the dates on which a loan payment is due, whether or not the payment is made. Such de-allocated corpus could be available to pay any obligations secured by the SRF general obligation credit. The SRF issuer could be permitted to grant liens on such de-allocated corpus (or any other SRF program assets) to other creditors so that such other creditors would have a superior claim on such amounts. Under the SRFGO structure of the instant invention it is believed that neither the corpus allocations nor the de-allocated amounts held by the SRF issuer would constitute "pledged funds" of any of the SRF issuer's bonds.

In this first embodiment of the instant invention, equity (which under the traditional approach would be deposited into the reserve fund), would be split into two portions. One portion would be deposited into what is called a subsidy escrow (or equity funded subsidy escrow). Both the earnings and equity of the subsidy escrow would be used in lieu of reserve fund earnings to defease the debt service subsidy. As such, the subsidy escrow would be considered a sinking fund and would be yield restricted. In one example, for twenty-year loans the subsidy escrow would consist of approximately 40% of the equity currently being deposited in a reserve fund. The other 60% of the equity would remain in the SRF fund and the equity and earnings on this portion would be retained in the SRF to be used to make additional loans or for other authorized purposes (this portion would not be either a pledged fund or sinking funds). Therefore these funds would be considered unrestricted.

To the extent that equity in the SRF Fund were not expended or pledged for other purposes, such amounts would be "available" to secure SRFGO obligations. However, there would be no pledge of such funds to secure SRFGO bonds or any covenant restricting the SRF issuer's ability to otherwise encumber such funds.

Further, the earnings on each borrower's corpus allocation would not be used to pay the SRF issuer's bond debt service nor to reduce the amount of loan debt service payable by such borrower. To ensure that earnings are not used for debt service, earnings could be paid to each borrower on a date shortly after the date on which any related SRF issuer's debt service is due. To help avoid a characterization of the corpus allocation as "sinking funds" for the bonds, the SRF issuer's obligation to pay corpus earnings to a borrower could be independent of whether or not the borrower pays its loan debt service to the SRF issuer.

A structuring alternative according to a second embodiment of the instant invention (which would further buttress the conclusion that the corpus earnings are not "sinking funds") would be for the SRF issuer to pay the borrowers their corpus earnings in advance. For example, the SRF issuer could pay a borrower an amount equal to the present value (discounted at the bond yield) of the expected corpus earnings (estimated at an agreed upon yield). The payment could fully liquidate the SRF issuer's obligation under the loan agreement to pay corpus earnings. The actual earnings on the borrowers' corpus allocation would then clearly not be applied to pay bond debt service and would be retained in the SRF program to be used to make additional loans or for any other authorized purposes.

It is noted that if all of the SRF issuer's bonds were to be equally secured by the SRF general obligations then all the ratings of the SRFGO program credit may be determined in relation to the ratings of the bonds pledged to secure the SRF issuer's loans (i.e., the SRF issuer's subordinate lien bonds). To help avoid this result, and in order to build in flexibility and to help avoid any issues over concentrated borrowers, a third embodiment of the instant invention may employ the creation of several tiers of SRFGO program credits.

In one example of this embodiment, the "first priority" SRFGO program credits could secure bonds issued to refund the SRF issuer's previously financed pooled loans (e.g., previously financed under a Master Financial Indenture ("MFI")). A "second priority" SRFGO program credit could be used to secure other SRF issuer's bonds issued to finance various loans that could conceivably affect the first priority SRFGO program credit but that are too small to affect the third priority SRFGO program credit. A "third priority" SRFGO program credit could secure other SRF issuer's bonds issued solely on behalf of a particular borrower. Finally, any additional loans could be financed by a "fourth priority" SRFGO program credit.

Figure 3:
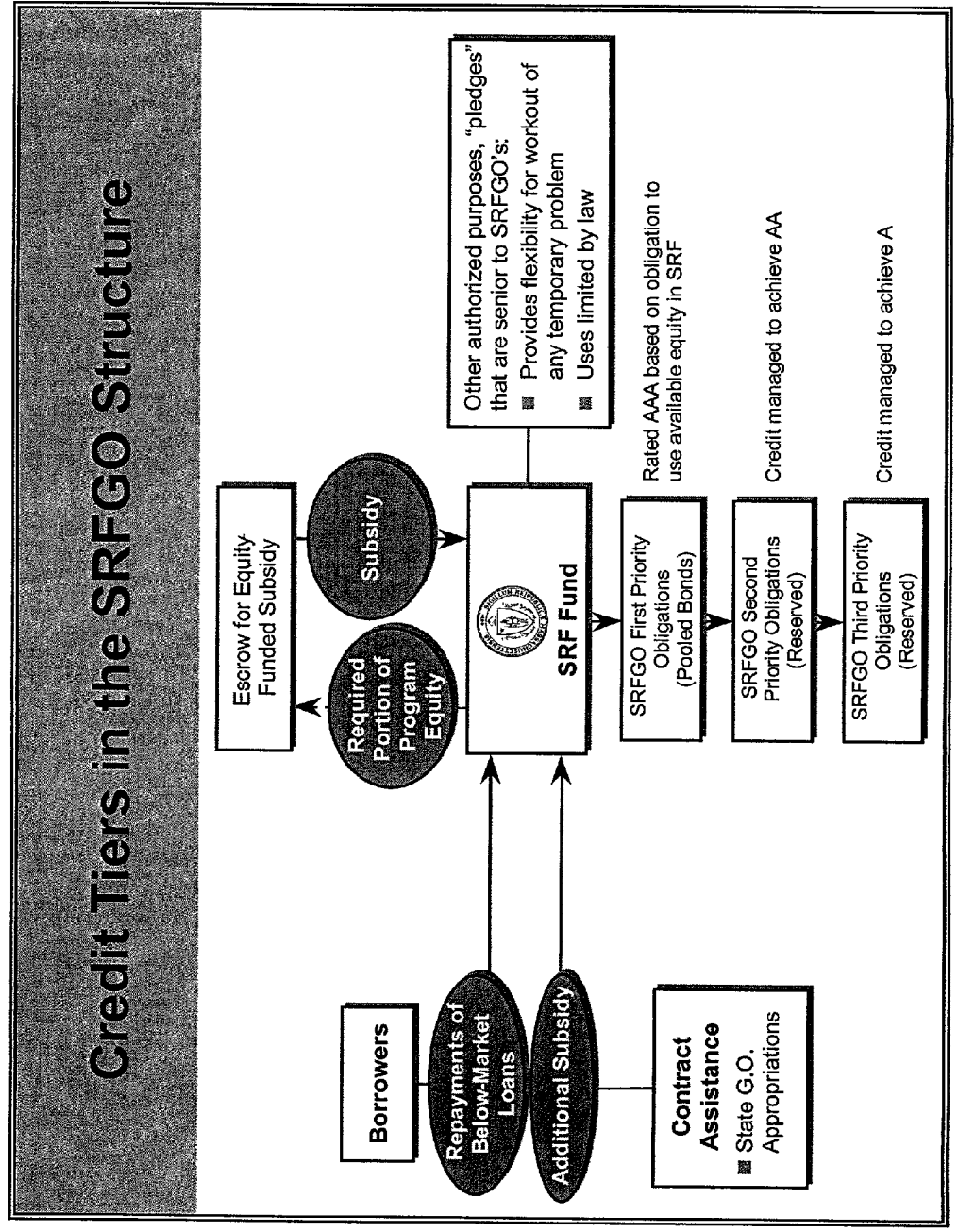
FIG. 3 shows a block diagram of an SRF structure according to an embodiment of the instant invention.

In another example of this embodiment, the "first priority" SRFGO program credit could include pooled loans going forward. A "second priority" and "third priority" SRFGO program credit could be created for future use if, for example, it ever becomes necessary to separate additional SRF issuer loans from the rest of the pool. Since the creation of the tiers of the SRFGO credits gives SRFGO bonds issued to finance pooled loans a claim on all available program equity ahead of other priority bonds, it is believed that the issues relating to number and diversity of the pooled borrowers should be either reduced or eliminated for all borrowers (other than possibly the SRF issuer). FIG. 3 shows a structure of various SRFGO priorities according to an embodiment of the invention.

In a fourth embodiment of the SFRGO approach according to the instant invention, the SFR issuer could yield restrict a portion of the corpus allocation but could invest the balance at an unrestricted yield. More particularly, the SRF issuer could fund an escrow from each borrower's corpus allocation in an amount sufficient with earnings at the bond yield to fully fund the interest subsidy (e.g., either 33% or 50% of the interest on each borrower's loan). The portion of the corpus allocation deposited in the escrow could be expended, with earnings, to provide an "interest subsidy", and could be yield restricted. It is believed that this structure would eliminate any tension between the desired tax law result and the applicable federal and state SRF statutes. None of the balance of the corpus allocation (or earnings thereon) could be used to pay bond or loan debt service. In fact, such earnings could be retained by the SRF issuer and used to leverage additional loans. Accordingly, none of this amount could be yield restricted as "bond proceeds." The use of a portion of the corpus itself to pay debt service should not be a problem. The SRF issuer is generally required to maintain the SRF in perpetuity. However, it is believed that there is generally not any prohibition on using corpus to pay debt service except in the context of state match bonds. Even under the traditional SRF structure the corpus generally would be used to pay debt service in the event of a default. In fact, if the SRF issuer were to invest the balance of the corpus at an unrestricted yield and retain those earnings itself, it would be enhancing the available resources of the SRF. The SRF issuer could have at least two options with respect to the disposition of the higher earnings on the non-escrowed portion of the corpus allocation: 1) retain the earnings (This seems the simplest from a tax perspective. In fact, the SRF issuer could take the position that to give the additional earnings to the borrowers would cause the corpus to be subject to yield restriction in which case the additional earnings would have to be paid to the federal government in yield reduction payments); or 2) the SRF issuer could increase the amount of the "interest subsidy" funded from the escrow. (This would give the benefit of unrestricted earnings to the borrower and would slightly increase the amount of restricted corpus. This option would probably work under applicable tax requirements, although its validity is likely to be less sure than the validity of the first option.) In either case, the specific unrestricted percentage of the corpus allocation would vary depending on the loan maturity (e.g., whether the loan matures over 20 or 30 years).

It is further noted that funding the escrow of the SRFGO according to the instant invention is believed to be consistent with any state requirement to maintain the SRF in perpetuity. In this regard, it is believed that there is no prohibition against spending equity, as opposed to just earnings, to pay bond debt service (except with respect to state match bonds). Moreover, it is believed that under the reserve fund model equity would also be spent in the event of a default and that since total earnings on program equity would likely be higher under the SRFGO approach (as compared to a traditional SRF), the available resources of the SFRGO program would be significantly greater over time than under the traditional reserve fund model.

It is further noted that an SRF issuer could convert to the SRFGO approach according to the instant invention by refunding outstanding refundable bonds. More particularly, bonds that could be refunded for savings could be refunded to their call date, likely resulting in varying levels of savings (before considering earnings on program equity), wherein the level of savings would depend on the specific bond coupons. Further, bonds that could not be refunded for savings could be refunded to maturity, resulting in dissavings (before earnings on program equity) substantially equal to transaction costs. Further still, non-refunded bonds from issues that were previously refunded (with subordinate refunding bonds) could also be refunded (such subordinate refunding bonds would likely not be eligible to be advance refunded). Further still, the refunded bonds could be legally defeased and the program equity in the reserve funds could be released from securing the refunded bonds. Further still, the released program equity could be returned to the SRF except to the extent required to fund the interest subsidy escrow. Further still, as a result of the universal cap (assuming no extension of maturities), virtually all of the program equity could be unrestricted for the life of the bonds (including the equity deposited in the interest subsidy escrow).

As discussed above, an interest subsidy escrow may be used to defease the interest subsidy, thereby preventing the balance of the corpus allocation from being characterized as a sinking fund and, together with the SRFGO credit, freeing such balance of the corpus allocation from yield restriction. Further, a reserve fund may be used to secure, and the reserve fund earnings may be used to pay debt service on, a limited portion of an SRF issuer's bonds, thus maximizing the permitted yield on the corpus allocation and allowing the unsecured bonds to be issued on a variable rate basis without adversely affecting corpus earnings (the unsecured bonds could be given a senior claim on the loans since the secured bonds could be fully payable from a collateralized Guaranteed Investment Contract ("GIC")).

Similarly, in a fifth embodiment of the SRFGO approach according to the instant invention the interest subsidy escrow could be used to pay debt service (principal and interest) only on a limited portion of SRF issuer's SRFGO bonds. Such portion of the bonds could be fully payable from a collateralized GIC and could have a lower priority of payment from loan repayments and the SRFGO credit. The unsecured bonds could have a higher priority of payment from loan repayments and SRFGO credit and could be issued as variable rate bonds without adversely affecting the yield on the portion of the corpus in the interest subsidy escrow.

Further, in a sixth embodiment of the instant invention the use of the SRFGO approach could be optimized for refundings for which the current taxable reinvestment rate is less than the yield on the GICs securing the prior issue (i.e., the yield on the prior issue). An SRF issuer's GICs could allow it the option of terminating or maintaining a GIC when it refunds a related bond. Thus, the SRF issuer could maximize the reinvestment rate on the portion of the corpus that remains in the SRF Fund under the SRFGO credit by maintaining those funds in the original GIC. In fact, since the SRF Fund monies are unrestricted, the SRF issuer could realize an increase in earnings to the extent that the GIC rate exceeds the arbitrage yield on the prior issue.

It is noted, however, that if a portion of the corpus were deposited in an interest subsidy escrow securing the refunding bonds, the yield on that portion would be restricted to the lower refunding bond yield. This effect can be avoided by: i) leaving unrefunded a portion of the prior issue such that the interest subsidy escrow exactly repays the unrefunded prior bonds; and ii) having the interest subsidy pay debt service (principal and interest) of such unrefunded bonds. Thus, the interest subsidy escrow could continue to be invested at the higher prior bond yield.

Moreover, if the yield on the unrefunded bonds were equal to the prior bond yield, the corpus amount required to fund the interest subsidy escrow would equal the amount of the unrefunded prior bonds. In this event, the SRF issuer would be indifferent (if the prior bonds were currently callable), except for transaction costs and universal cap effect (discussed below), between: i) leaving the prior bonds outstanding and investing the interest subsidy escrow in the existing GIC at the prior bond yield; and ii) refunding the prior bonds and investing the interest subsidy escrow in a new GIC at the refunding bond yield. In fact, there would be little difference between those two yields. However, if the prior bonds are not currently callable, the SRF issuer would not get the benefit of the lower refunding coupon until after the call date, whereas the interest subsidy escrow would be immediately restricted to the lower refunding bond yield. Thus, before taking account of the universal cap, the SRF issuer would be better off having the interest subsidy escrow secure unrefunded prior bonds whenever a significant period remains until the call date. The universal cap further clouds the issue because prior to the first call date on the refunded bonds, an interest subsidy escrow securing the refunding bonds would be fully unrestricted as a result of the universal cap, allowing the SRF issuer not only to invest at the higher prior bond yield, but also to benefit from GICs with yields higher than the arbitrage yield on the prior bonds. However, the universal cap benefit could be significantly reduced once any of the prior bonds are called for redemption. Thus, the determination whether to have the interest subsidy escrow secure the refunded or refunding bonds would have to be determined on a case by case basis.

Referring now to the financial benefit of using the SRFGO structure of the instant invention in connection with an embodiment directed to the Massachusetts Water Pollution Abatement Trust ("MWPA Trust"), Table 1 below summarizes the example savings for new loans of both 20 and 30 years. For 20-year loans, the indicated gross savings represent 72% of earnings that would be rebated under the traditional reserve model. For 30-year loans the gross savings represent 61% of earnings that would be rebated under the traditional reserve model.

TABLE 1

SRFGO Present Value (PV) Benefit on New Money Loans

| Loan Term | Unrestricted % of Program Equity | Gross Benefit As a % of Program Equity | PV Benefit As a % of Loan Par |
|---|---|---|---|
| 20 Years | 60% | 11.4% | 3.99% |
| 30 Years | 45% | 16.1% | 3.56% |

To the extent that some of the existing MWPA Trust GICs were bid to blend the construction fund and reasonably required reserve, and depending strongly upon the shape of the yield curve when the GIC was bid, the MWPA Trust may have already realized a portion of these savings. In any case, assuming the MWPA Trust makes $200 million in leveraged loans per year for the next 10 years, the Present Value ("PV") benefit of the SRFGO structure for such new money loans would be approximately $59.5 million.

An additional PV benefit would be realized on future refunding issues. Since the SRFGO structure features a lesser amount of restricted equity, more bonds could be refinanced in future refundings, increasing the savings of such refundings. Assuming that the MWPA Trust refunds $500 million of pool bonds over the next 10 years, the incremental PV benefit from the SRFGO structure alone could be $6 million.

Of course, the previous discussions beg the question of how could the MWPA Trust realize a portion of the PV benefit from unrestricted earnings that are lost because the subsidy escrow is restricted? One mechanism that could possibly produce the desired result is to provide a rationale where the subsidy escrow is not used to pay bond service. Of course, this would require an additional source of funds to pay debt service.

Essentially, debt service in the SRF can only come from loan repayments, state payments, equity earnings or program equity. A potential source of debt service payments that would reduce restricted funds would be future loan repayments, future state payments, or future program equity. In other words if debt service is funded with "pay as you go" equity from federal and state grants or from new leveraged loans, the subsidy escrow might not be considered a sinking fund and would therefore be unrestricted. It is noted, however, that in order for SRF counsel to give an opinion, such counsel would need to be comfortable with the future availability of at least one of these sources of debt service payment.

Further, since the MWPA Trust's borrowers are legally responsible to pay gross debt service, another potential mechanism would use the gross borrower payments for debt service and to apply earnings on equity to provide a subsidy to the borrowers. The issue with this approach is whether the subsidy would be viewed as a reimbursement of the borrowers' debt service payment.

Beyond the financial benefit of unrestricting a portion of the reserve funds, the SRFGO approach of the present embodiment can potentially also provide additional programmatic and credit flexibility, such as the ability to:

Broaden qualifying projects: Just as the use of the SRF was expanded to include drinking water loans, in the future the SRF definition relating to a project's ability to qualify for the SRF may again be materially changed. It is believed that the SRFGO approach, and the availability of different "priorities", will simplify the process of broadening qualifying projects.

Increase program leverage: Increasing or decreasing program leverage becomes just another program consideration under the SRFGO approach, as leverage can be targeted on a case-by-case basis.

Cross-collateralize: The SRFGO structure, which eliminates the pledge of specific reserves, can be used to cross-collateralize essentially any loans or loan types without changes to the program indenture.

Provide a security source for interim financings: The SRFGO credit could be used to secure sources of interim financing such as BANs or Commercial Paper, for example.

Modify types and amounts of financial assistance: Not only can the leveraging ratio be determined by the SRFGO issuer but, correspondingly, the SRFGO issuer can target the level of subsidy for different types of borrowers.

Issue parity bonds without a reserve fund: It is believed that under the SRFGO approach there is no reason that parity bonds without any reserves or subsidy could be issued.

Reduce investment liquidity: Without the need for complete liquidity on all reserves, the SRFGO issuer will be free to seek higher taxable investment returns by reducing the required liquidity of investment instruments. Additionally, the SRFGO issuer would be less dependent upon the narrow universe of GIC providers for investments.

Use variable rate bonds: The SRFGO credit can provide a source of security for issuing variable rate debt, offering a low-cost financing vehicle. In fact, it is believed that any large amount of SRFGO issuer assets would allow the SRFGO issuer to provide self-liquidity or, at the very least, assure low costs for bank liquidity facilities.

Regarding potential EPA concerns with the use of equity and the recycling of funds in the SRF context, it is believed that a careful analysis shows that these concerns can be sufficiently addressed. The analysis will address changes in program cash flows (with a particular focus on changes that affect program equity) as well as changes in the way that program equity is used to provide security for the program's SRF bonds.

Referring now to program cash flows, under both the traditional reserve model and the SRFGO structure of the instant invention, the sources of funds ("Sources of Funds") fall into the following categories:

Program equity

Earnings on equity at the bond yield

Earnings on equity above the bond yield

Under each approach (i.e., traditional reserve model and SRFGO structure), on any date, there are four potential uses to which the SRF issuer can apply program funds, both equity and earnings ("Uses of Funds"):

Pay to or on behalf of borrowers to provide a subsidy

Retain as invested equity as part of a borrower's corpus allocation

Rebate to the U.S. Treasury

Make available for other SRF purposes ("de-allocate")

Figure 4:
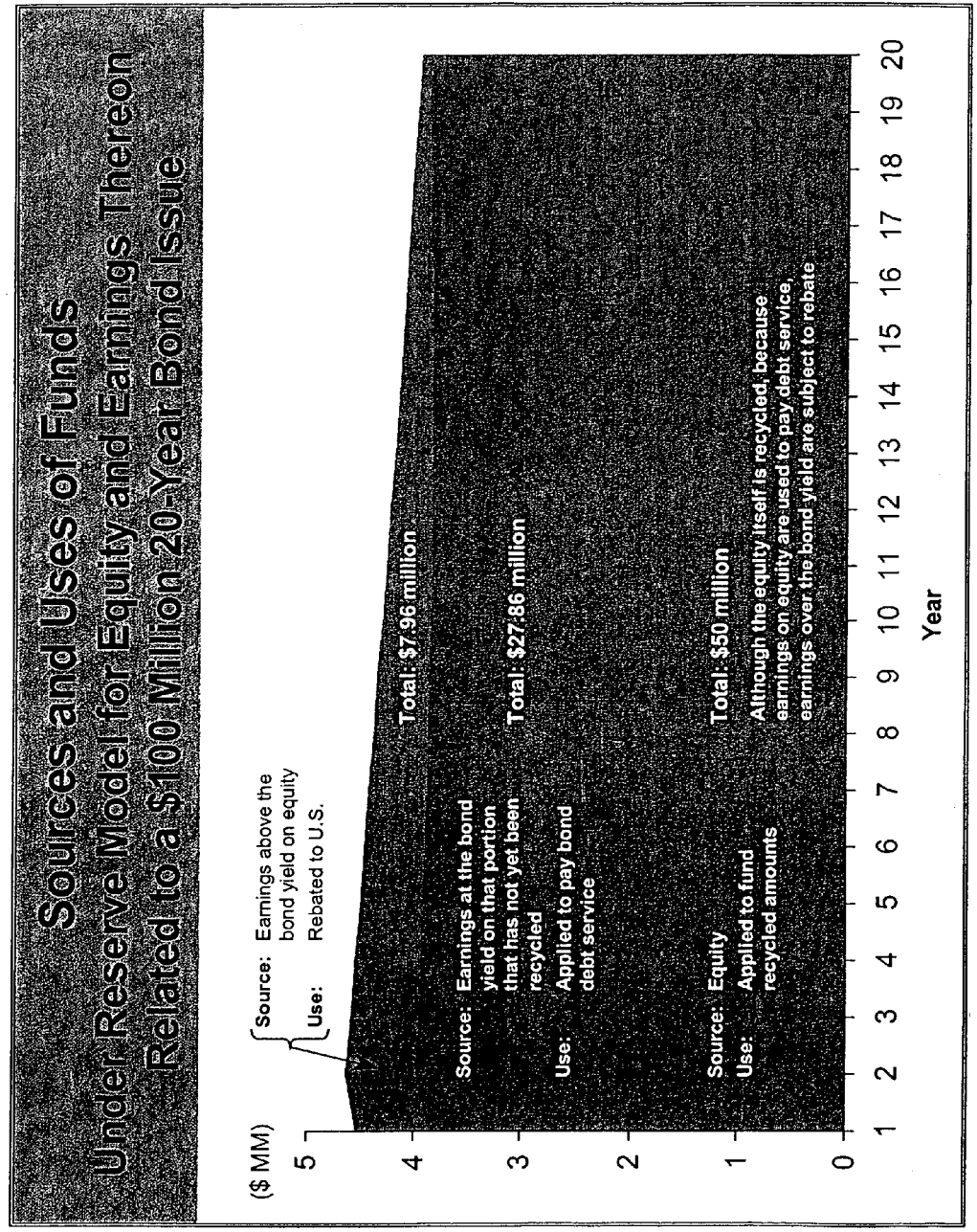
FIG. 4 shows Sources and Uses of Funds under the traditional reserve fund model.

The Sources of Funds and the Uses of Funds for the traditional reserve fund model are shown in FIG. 4 for a sample $100 million, 20-year loan.

Under the SRFGO approach, portions of the amounts available within the individual Source of Funds categories are applied to different Uses of Funds, as shown in Table 2:

TABLE 2

Use of Funds Under the Reserve and SRFGO Approach

| Category of Funds | Use of Funds in Reserve Model | Use of Funds in SRFGO Approach |
| --- | --- | --- |
| Program Equity | Retained as invested equity until de-allocated | Retained as invested until either de-allocated or used to fund subsidy |
| Earnings Within Bond Yield | Used to fund subsidy | Used to fund subsidy or either added to invested equity or de-allocated |
| Earnings Over Bond Yield | Rebated to U.S. Treasury | Partially rebated to U.S. Treasury and partially used either to fund subsidy, to increase invested equity, or de-allocated. |

The change in the way that program equity and earnings within the bond yield are applied results in a significant programmatic enhancement, i.e., the ability to retain a portion of the earnings in excess of the bond yield.

It is noted that program equity is believed to be available to be used directly to pay debt service. The reasoning goes as follows: First, providing a below market loan and securing the payment of SRF bonds are authorized purposes of the SRF. Second, in existing SRF structures, it is contemplated that equity would be used to pay debt service in the event of a loan default. Finally, in the context of state match bonds, the regulations make clear that such bonds can only be retired from "interest earned by the SRF" (including interest on SRF loans), making it clear that without this explicit limitation, program equity as well as earnings could be used to pay such bonds.

When considering the relative cash flows of the two approaches (i.e., traditional reserve model and SRFGO structure), specifically on dates on which monies are either received or applied, it is believed that the EPA will assess the following factors:

The amount of invested program equity prior to any receipt or application of funds;

The amounts available on each such date to provide borrower subsidies;

The amount available for de-allocation on each such date;

The amount of invested program equity after any receipt or application of funds; and The amount of earnings required to be rebated to the U.S. Treasury.

The amount of earnings required to be rebated is reduced under the SRFGO approach by 61% for 30-year loans and 71% for 20-year loans (at least in the context of the MWPA Trust embodiment—other embodiments may, of course, have other rebate ratios). The additional earnings retained by the SRF issuer could be used: 1) to increase borrower subsidies; and/or 2) to increase the invested equity; and/or 3) to increase de-allocated funds.

For the sake of clarity, the cash flows are analyzed both with and without taking into account the additional retained earnings under the SRFGO approach.

For cash flows without taking account of additional earnings retained under the SRFGO approach: 1) the amount of invested equity prior to any receipt or application of funds is essentially identical under both approaches; 2) the amounts available to provide borrower subsidies are essentially identical under both approaches; 3) the amount available for de-allocation is essentially identical under both approaches; and 4) the invested equity after any receipt or application of funds is essentially identical under both approaches.

So, before taking account of the additional retained earnings under the SRFGO approach, the cash flows for the two approaches are essentially identical from an EPA perspective. Since the cash flow comparison shows that there is essentially no reduction in the amount of program equity available on any date, it is believed that no issue exists with respect to the perpetuity requirement. Since the funds available for subsidies and de-allocation are also essentially identical under both approaches (before into taking account the additional retained earnings), it is believed that there should be no EPA issue with respect to the cash flows under the SRFGO approach.

On the other hand, for cash flows taking into account the additional earnings retained under SRFGO approach, more total dollars are available as a result of the reduction in rebated earnings (for the SRFGO approach). The cash flow comparison indicates, for one embodiment, that the additional dollars available represent more than 11.6% of the original program equity for 20-year loans and more than 16.4% of the original program equity for 30-year loans. The additional amounts available could be used, in whole or in part, to: 1) increase the borrower subsidy; and/or 2) increase invested funds; and/or 3) increase the de-allocated funds made available for other SRF purposes. In one embodiment, the present value of the additional retained earnings is 8.2% of the original equity for 20-year loans and 9.6% for 30-year loans.

Figure 5:
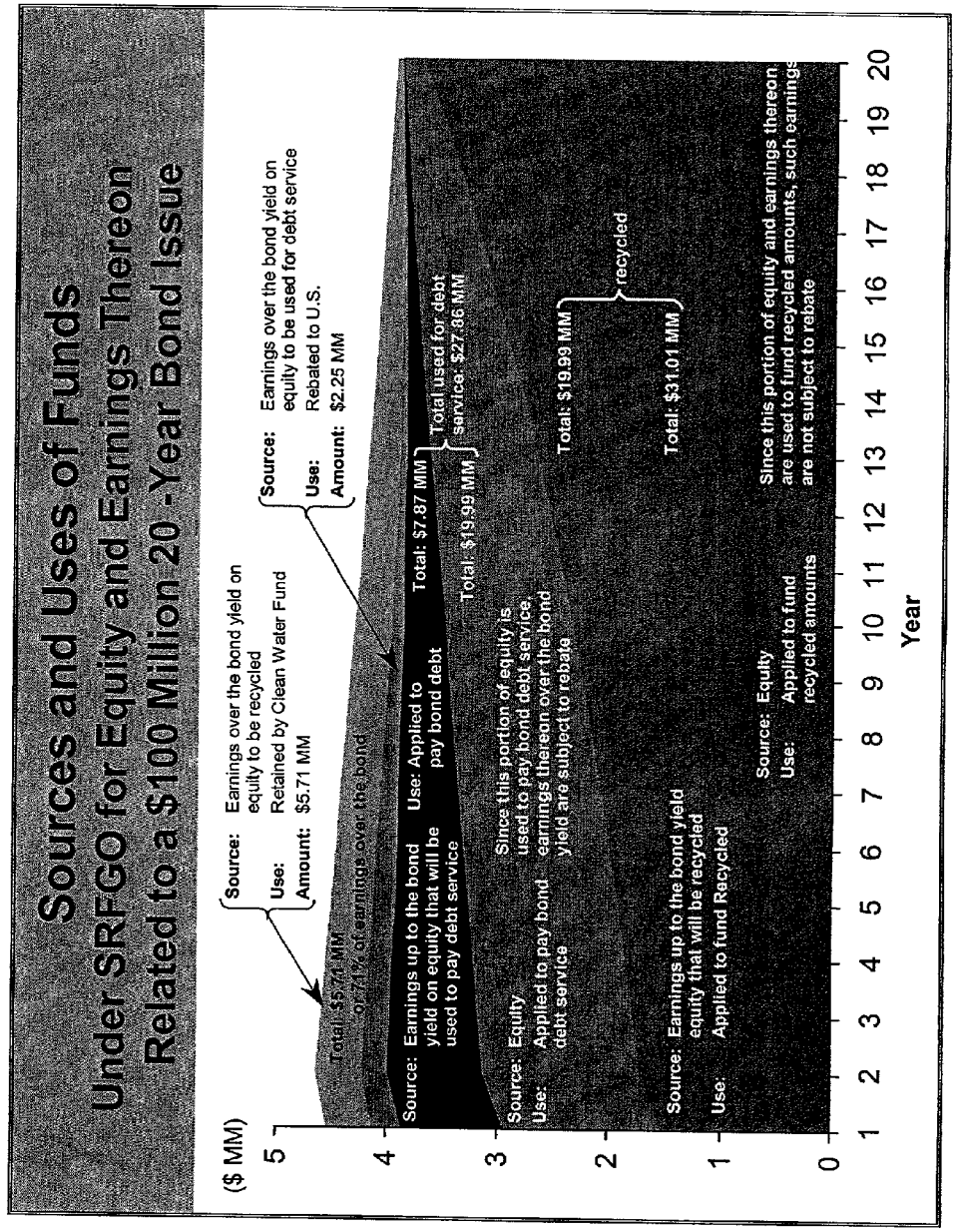
FIG. 5 shows Sources and Uses of Funds under an SRF structure according to an embodiment of the instant invention.

Under the SRFGO approach, more total dollars are available as a result of the reduction in rebated earnings. FIG. 5 shows the additional $5.71 million retained in the program under the MWPA Trust embodiment. These additional amounts could be used in whole or in part to: 1) increase the borrower subsidy; and/or 2) increase invested funds; and/or 3) increase the de-allocated funds made available for other SRF purposes.

Taking account of the additional amounts available, the analysis demonstrates that this embodiment of the SRFGO approach is either identical or superior to the traditional reserve model since the amounts available for each purpose (other than rebate) are equal to or greater than the amounts available under the traditional reserve model.

The additional monies are available under the SRFGO approach as a result of two subtle changes. First, program equity is no longer "pledged" for arbitrage purposes. As discussed below, program equity continues to be a source of security for the bonds. Second, by using a portion of the program equity to provide part of the subsidy, the remainder of the program equity is not deemed to be "sinking funds" and can be invested above the bond yield, free from yield restriction or rebate. The portion of the equity used to provide the subsidy continues to be "sinking funds" and is subject to yield restriction/rebate. The amount of yield restricted program equity that is used to provide a subsidy is simultaneously replenished from earnings on the unrestricted equity. Thus, there is in effect essentially no reduction in the amount of program equity.

It is noted that the structural changes in the program cash flows under the SRFGO approach (as opposed to the traditional reserve model) may be significant from a tax and arbitrage perspective in that they reduce the amount of program equity that is deemed to be "sinking funds". However, it is believed that from an EPA perspective, the amounts available under the SRFGO approach for each purpose of the SRF program are equal or greater than under the traditional reserve model.

As is the case with the program cash flows, the change in security under the SRFGO approach may be significant from a tax and arbitrage perspective but is believed to be neither significant nor adverse from an EPA perspective. The changes provide greater flexibility for the SRF issuer to use equity for additional legally authorized purposes, including making loans or securing loans financed outside of the SRFGO structure. Such purposes may include activities that are not currently authorized or contemplated. This additional flexibility is achieve by eliminating the legal pledge of equity that exists under the traditional reserve model. In addition to eliminating the legal pledge, the SRF issuer could agree not to make any negative covenants restricting its ability to use equity for legally authorized purposes.

While program equity is not legally pledged under this embodiment, it will, to the extent not expended or otherwise pledged or committed by the SRF issuer, still provide security for the SRFGO bonds. The SRF issuer may be contractually obligated to use such amounts that remain available at any time to cure any deficiency with respect to amounts available to pay the SRFGO bonds. This new credit structure is believed to be consistent with the EPA's SRF regulations which authorize the SRF to be used as security for SRF bonds. It is further believed that the EPA's SRF regulations do not suggest that the traditional reserve model or a legal pledge of equity is more appropriate than any other security structure.

In addition to providing valuable programmatic flexibility, the change in credit structure may be necessary to avoid having the SRF equity characterized as "pledged funds" which could result in the equity being subject to yield restriction or rebate. It is believed that any impact of the change on the SRF program credit should be slight.

Further, it is believed that an SRFGO will carry a significant credit value with rating agencies and investors. How much value the SRFGO receives is a function of several factors: (1) the amount of program assets expected to be available, (2) the expected amount of the obligations payable from such assets (taking into account any expected prior obligations), and (3) the SRFGO issuer's operating procedures and policies.

It is important to note that, as demonstrated above, the amount of funds retained in the SRF program in the SRFGO structure may be greater than is the case with the traditional reserve model, since a portion of the earnings which are currently rebated to the federal government would be retained by the SRF issuer. Furthermore, the uses for the funds in the SRFGO, which are available to cure defaults but are not pledged to do so, are limited by the federal law that created the SRF. A notable change in the SRFGO structure is the increased dependence on the management of the SRFGO.

Since the SRF issuer will have more discretion under the SRFGO program structure with respect to the use of deallocated reserves, it is important that a set of operating procedures and policies be articulated with respect to making loans, levels of loan subsidies, and methods for mitigating the impact of borrower defaults. It is believed that rating agencies and investors will look for experience, intent, and consistency of approach in the operating of the program in light of the modified legal protections contemplated. As an example, when the New York Power Authority moved to a corporate style indenture in 1998, the rating agencies gave substantial credit to its historically strong management and strong reserve levels. However, in light of the lack of a pledged debt service reserve fund, its board and management expressed a policy to maintain certain liquidity and coverage.

In order to implement the SRFGO structure according to one embodiment of the invention, the MWPA Trust would need to refund most or all of its outstanding bonds and issue new bonds backed by the SRFGO credit. For the purposes of illustration the following is an example examination of a refunding of the bonds in the MWPA Trust's pool program. Since none of these bonds have been previously refunded with a "senior-subordinate" structure, the analysis (which is summarized below) is more straightforward.

More particularly, if current market rates are lower than a prior bond series' rates the prior bonds should be called at the first date that produces savings, and the refunding is referred to as "high-to-low". The traditional approach to a "high-to-low" SRF refunding is the senior-subordinate structure, where a portion of the prior bonds which have debt service equal to the prior reserve earnings are left outstanding. In the traditional approach, only a portion of the potential bond savings is realized. The reserve fund continues to earn at the prior bond yield until the prior bond call date. After the prior bond call date it is believed that, as a benefit of the universal cap, the portion of the equity exceeding the value of the outstanding prior bonds becomes unrestricted.

The SRFGO approach to "high-to-low" refundings includes at least two options. The first is a modified version of the senior-subordinate structure. The second is a full refunding of the prior bonds. In the SRFGO approach the option producing the highest savings may be used. The SRFGO approach of the present embodiment is believed to have the following advantages over the traditional senior-subordinate approach:

1) Just as in the Senior-Subordinate case, the SRFGO structure results in larger subordinate refundings of bonds issued in 1993 and later. This is because the concept of a "subsidy escrow" is mathematically equivalent to using the "earnings test" rather than the "balance test" to determine how many bonds remain unrefunded.

2) In the SRFGO approach, unlike the traditional Senior-Subordinate structure, the equity deposited in the SRF Fund becomes unrestricted immediately. Therefore, the more time to the call date of the prior bonds, the greater the incremental benefit of the SRFGO structure will be.

3) For some series, there is an additional universal cap benefit under the SRFGO approach; if a full refunding of the prior bonds is used, a portion of the "subsidy escrow" is unrestricted until the call date for the refunded bonds.

4) With the SRFGO structure, all refundings can be completed at the same time, eliminating the SRF issuer's exposure to market risk.

On the other hand, if current market rates are higher than a prior bond series' rates the prior bonds cannot be called unless a legitimate programmatic reason for doing so exists, and the refunding is referred to as "low-to-high". These bonds are not eligible to be refunded under the traditional approach. However, it is believed that implementing the SRFGO structure is a legitimate purpose for refunding these series. A "low-to-high" refunding of a non-SRF issue produces no present value savings. In fact, such a refunding produces a PV loss equal to the cost of issuance. However, in the case of SRF bonds with large reserve funds, there is a significant universal cap benefit to refundings. In a "low-to-high" SRFGO refunding where the term of the debt is not extended, the entire reserve, including the subsidy escrow, is essentially unrestricted for the entire term. Even if the loan were extended by 10 years (e.g. from 20 to 30 years), there is a significant PV benefit on the subsidy escrow earnings.

Refunding all of the outstanding pool bonds using the SRFGO approach (according to the MWPA Trust embodiment) would result in approximately a $1.1 billion refunding series and would produce approximately $36.4 million in PV savings. Table 3 below summarizes the savings available under both the SRFGO approach of the present embodiment and the traditional senior-subordinate structure, assuming none of the loans is extended.

TABLE 3

Refunding Savings Summary

| | Traditional Senior-Subordinate Refunding | SRFGO Approach |
|---|---|---|
| Refunding Par | $508,111,979 | $1,120,785,000 |
| Refunded Par | $537,820,512 | $1,067,055,430 |
| PV Savings | $19,707,303 | $36,359,884 |
| % Savings of Refunded Par | 3.66% | 3.41% |

Note that in the SRFGO refunding all of the outstanding bonds are refunded, while in the traditional refunding only series that produce PV savings of greater than 2% are included. Also, to the extent that any of the investment GICs were bid out to maximize earnings on the reasonably required reserve portion of the reserve by increasing construction fund earnings, some of the refunding savings may already have been locked in. This is true for both the traditional and SRFGO refundings.

The SRFGO approach provides flexibility for the MWPA Trust going forward. Also, implementing the SRFGO structure produces a number of financial benefits. The estimated PV savings from each of these is summarized below in Table 4:

TABLE 4

Summary of Estimated SRF G.O. PV Benefit

| Source | PV Benefit |
|---|---|
| PV of Savings on Future New Money | $59.5 MM |
| Refunding Savings | 36.4 MM |

TABLE 4-continued

Summary of Estimated SRF G.O. PV Benefit

| Source | PV Benefit |
|---|---|
| Estimated PV Benefit on Future Refundings | 6.0 MM |
| Total: | $101.9 MM |

The SRFGO approach according to the MWPA Trust embodiment has an estimated aggregate PV benefit of approximately $102 million, or approximately 9.5% of the refunded par, and would result in an ongoing program that is believed to be easier to manage (compared to a traditional reserve model).

Another embodiment of the SRFGO approach according to the instant invention in which the Texas Water Development Board ("TWDB") acts as SRF issuer will now be described.

As seen in FIG. 6, the escrow fund of the SRFGO approach in the context of the TWDB embodiment provides the same interest subsidy as would have been provided by a traditional reserve fund, but requires a smaller deposit of program equity.

Further, as seen in Table 5 below, the amount of program equity that remains unrestricted in the SRFGO Fund varies depending upon loan maturity and more than 2.5% present value savings could be realized on every new loan.

TABLE 5

| Loan Term | Unrestricted Percentage of Corpus Allocation | Present Value (PV) Benefit |
|---|---|---|
| 20 Years | 60% | 2.6% |
| 30 Years | 46% | 2.6% |

Moreover, as discussed above, funding the escrow with program equity is consistent with the requirement to maintain the SRF in perpetuity. More particularly, it is noted that: 1) there is no prohibition against spending equity, as opposed to just earnings, to pay bond debt service (except with respect to state match funds); 2) under the traditional reserve fund model equity would also be spent in the event of a default; 3) since total earnings on program equity would be higher under the SRFGO approach, the available resources of the program would be significantly greater over time than under the traditional reserve fund model (if the additional earnings are retained within the SRF Fund; and 4) if additional earnings are applied to increase the interest subsidy, then the available program resources will be essentially the same as under the traditional reserve fund model.

Figure 7:
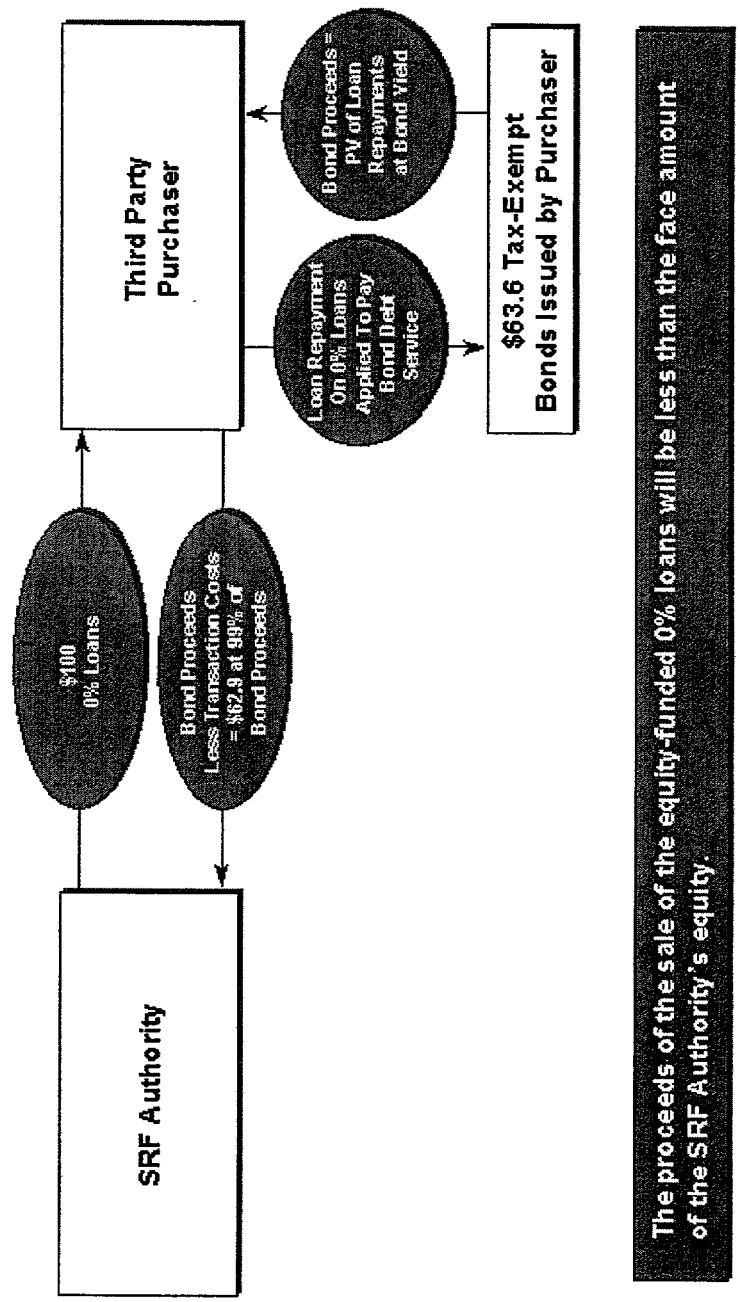
FIG. 7 shows investment of unrestricted equity according to an embodiment of the instant invention.

Referring now to FIG. 7, it is seen that if equity could be invested unrestricted, to benefit from the investment opportunity an SRF Authority (or issuer) using the cash flow model would have to sell a portion of its loan portfolio to a third party (the proceeds of the sale of the equity-funded 0% loans could be less than the face amount of the SRF Authority's equity).

Regarding the tax-exempt refinancing of an equity-funded loan portfolio, it is noted that: 1) an SRF Authority can only issue tax-exempt bonds to reimburse itself for equity used to make loans based on official action prior to making the loans and within 18 months of the bond issuance; 2) if bonds received from underlying borrowers to secure SRF loans were issued as tax-exempt bonds, the borrower bonds can be sold to a third party that can finance the purchase on a tax-exempt basis; 3) if the underlying borrower bonds were issued as taxable bonds, then they must be refunded by the borrower with tax-exempt borrower bonds before the loans can be purchased by a third party with tax-exempt proceeds; 4) the SRF Authority must sell only that portion of its loans that was funded with equity rather than bond proceeds; and 5) unless an allocation was made within 18 months of making the loan, each loan will be deemed to be made pro rata from equity and bond proceeds, thus the SRF Authority would not be able to simply sell the largest loans in the portfolio.

Referring now to FIG. 8, it is seen that although the purchase price of the 0% loans will be less than the SRF Authority's equity, the purchase price together with earnings thereon at an unrestricted yield will exceed the original equity.

Regarding the effect of achieving unrestricted investment on all program equity, it is noted that: 1) the present value of the 0% loans will be less than the amount of original equity; 2) to fully recover its equity, the SRF Authority would also have to sell a portion of its market rate loans; 3) since the market rate loans were funded with bond proceeds, the sale proceeds might continue to be viewed as bond proceeds; 4) since principal and interest on the market rate loans is needed for bond debt service, the sale proceeds from these loans and earnings thereon would need to be used to pay the bonds; and 5) it is believed that the sale proceeds of the market rate loan proceeds would be yield restricted under current law as sinking fund proceeds and that if viewed as bond proceeds such sale proceeds would be restricted even under the proposed legislation on SRF equity.

Figure 9:
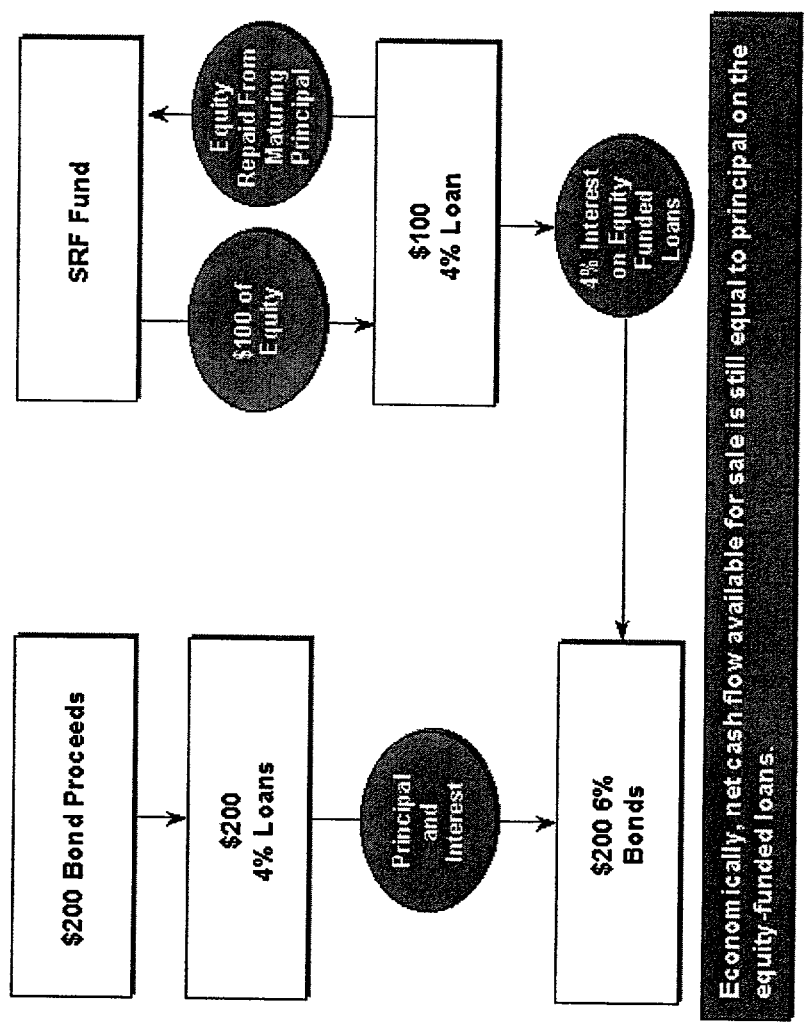
FIG. 9 shows a diagram of loans made at a blended-rate according to an embodiment of the instant invention.

Referring now to FIG. 9, a diagram in connection with loans made at a blended rate (rather than making market rate loans with bond proceeds and 0% loans with equity) is shown.

More particularly, with regard to all loans being made at a blended-rate, it is noted that: 1) the cash flow from the equity-funded loans is considerable higher; 2) the sale price of the equity-funded loans would be higher; 3) the excess cash flow above bond debt service still equals the principal on the equity-funded loans (thus, the additional proceeds of the loan sale (and earnings thereon) would be needed to pay bond debt service; 4) it is believed that under current law, the additional sale proceeds would be yield restricted (however, it is believed that under the proposed legislation they would become unrestricted); 5) it is believed that under current law there is essentially no benefit to receiving such additional loan sale proceeds; 6) it is not necessary to sell all of the equity-funded loans, but only a portion of those loans for which the loan repayments (principal and interest) equal loan principal repayments; and 7) it is believed that all of the equity that can be restricted under current law can be recovered without selling any portion of the smallest loans or loans with credit issues.

Referring now to FIG. 10, it is seen that the TWDB could achieve savings by selling a portion of its equity-funded loans and refunding its SRF bonds according to an embodiment of the SRFGO approach.

Figure 11:
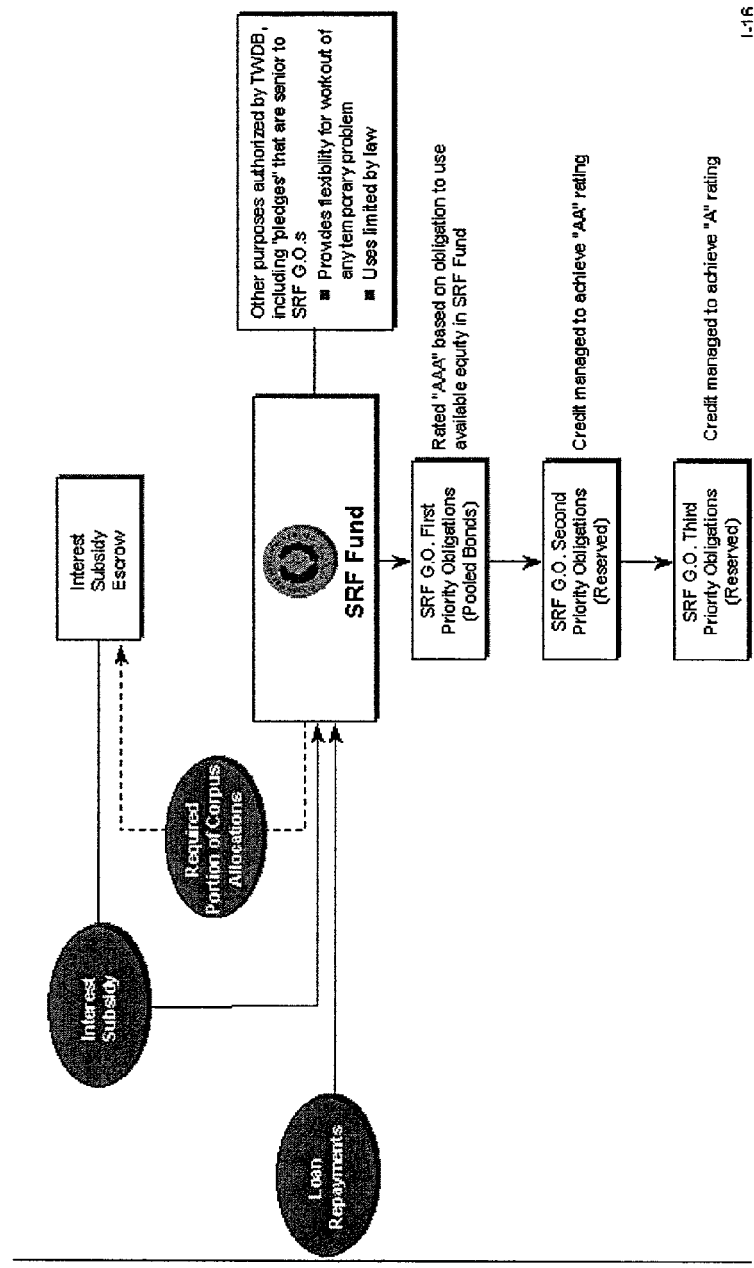
FIG. 11 shows a diagram of a security structure according to an embodiment of the instant invention.

Referring now to FIG. 11, it is seen that under an embodiment of the SRFGO approach, TWDB bonds could be secured by loan repayments and other available monies in the SRF Fund.

In another embodiment of the present invention an alternative mechanism that would increase the earnings on program equity for an issuer who is either leveraging for the first time or has leveraged using the cash flow approach is provided. As modified for application to such an issuer, the SRFGO approach may be as follows: For upcoming loans, fund all loans from bond proceeds. The bonds would be secured by loan interest (e.g. drinking loan interest) and principal payments. The interest subsidy on the loans funded by the new bonds would be funded with loan principal and interest on the equity funded loans (it is believed that this would not create a new tax consequence). The capitalization grants and state match funds received in connection with the new loans would remain in the general SRF fund and would not be pledged to secure the bonds, used to pay debt service, or provide an interest subsidy. Such amounts would be available for any lawful purpose of the SRF fund and could be invested at an unrestricted yield. Effectively, this approach would result in 100% of the new equity being unrestricted (because existing loans are used). The additional earnings retained by the fund as a result of this approach could be applied to increase the amount of program equity or for other program purposes.

While a number of embodiments of the instant invention have been described, it is understood that these embodiments are illustrative only, and not restrictive, and that many modifications may become apparent to those of ordinary skill in the art. For example, the SRFGO structure according to the instant invention may be utilized in connection with an initial financing or a refinancing (i.e., a refunding). If done in connection with a refunding, the refunding could be a savings refunding (e.g., a "high to low" refunding in which old bonds are refunded with lower coupon refunding bonds and the proceeds of the refunding bonds are used to call the refunded bonds on their first call date) or a stretch out refunding (e.g., a "low to high" refunding in which the primary purpose is to reduce annual debt service by repaying debt over a longer period of time). Further, the SRFGO structure according to the instant invention may be utilized to provide the SRF issuer with the flexibility to broaden qualifying projects, increase program leverage, modify types and/or amounts of financial assistance, issue parity bonds without a reserve fund, reduce investment liquidity, and modify the credit structure. Further still, the SRFGO structure according to the instant invention may be utilized to maintain a relatively high level of default tolerance (compared to a traditional SRF). Further still, the SRFGO structure according to the instant invention may be utilized in an SRF program under the federal Clean Water Act. Further still, "available" funds in the SRF Fund which may be used for the General Obligations may be the result of: a) interest subsidies from the interest subsidy fund which are not needed for bond debt service and/or b) interest subsidies from the equity funded subsidy escrow which are not needed for bond debt service, and/or c) excess borrower repayments. Further still, there may be a single interest subsidy fund or there may be a number of interest subsidy funds each corresponding to one or more loan(s)/bond(s). Further still, there may be a single equity funded subsidy escrow or there may be a number of equity funded subsidy escrows each corresponding to one or more loan(s)/bond(s). Further still, the interest subsidies from the interest subsidy fund and the equity funded subsidy escrow may be earmarked for bond debt service of a particular loan/bond or the interest subsidies may be applied to the SRF Fund as a whole. Further still, the SRFGO structure according to the instant invention may be utilized by any appropriate SRF issuer (such as the New York State Environmental Facilities Authority ("EFA"), the State of Connecticut's Clean Water Fund ("CEF"), the Michigan Municipal Bond Authority ("MBA"), the Texas Water Development Board ("TWDB"), or the Massachusetts Water Pollution Abatement Trust ("MWPA Trust"), for example) and the loans of the SRFGO structure according to the instant invention may be made to any appropriate borrower (such as the New York City Municipal Water Finance Authority ("NYCMWFA"), for example). Further still, the SRFGO structure according to the instant invention may utilize variable rate debt and/or forward purchase of bonds (e.g., tax-exempt bonds). Further still, while some states refer to "program equity" and some states refer to "corpus allocation", for the purposes of the present application the meanings of the two terms are intended to be essentially the same. Further still, while some states (e.g., New York) currently require that a particular corpus allocation correspond to a particular loan, the present invention is, of course, not limited to an embodiment reflecting such a state requirement. Further still, the present invention may be employed in the context of old loans made using the cash flow model, wherein loans (e.g., the existing loans) may be "bundled" to structure a general obligation with a pledge of such loans. Further still, the methods described may be embodied in a software program and/or a computer system.

What is claimed is:

1. A method implemented by a programmed computer system for structuring a state revolving fund bond program, wherein the state revolving fund bond program includes at least one bond, the method comprising:
    inputting to the computer system data regarding a pledge of borrower loan payments associated with at least one loan;
    primarily securing each bond associated with the state revolving fund bond program by the pledge of borrower loan payments;
    inputting to the computer system data regarding a limited recourse general obligation;
    secondarily securing each bond associated with the state revolving fund bond program by the limited recourse general obligation;
    inputting to the computer system data regarding a corpus allocation corresponding to each loan;
    excluding the corpus allocation corresponding to each loan from being available to meet the limited recourse general obligation;
    inputting to the computer system data regarding earnings from the corpus allocation corresponding to each loan; and
    paying earnings from the corpus allocation corresponding to a given loan to a borrower associated with the given loan.

2. The method of claim 1, wherein the step of excluding the corpus allocation corresponding to each loan from being available to meet the limited recourse general obligation further comprises excluding the corpus allocation corresponding to each loan from being available to meet the limited recourse general obligation until at least a portion of the corpus allocation has been de-allocated, after which the de-allocated portion of the corpus allocation is made available to meet the limited recourse general obligation.

3. The method of claim 2, wherein the portion of the corpus allocation corresponding to a given loan is de-allocated on the date on which a loan payment associated with the given loan is due.

4. The method of claim 3, wherein the portion of the corpus allocation corresponding to the given loan is de-allocated regardless of whether the loan payment associated with the given loan is actually made.

5. The method of claim 2, wherein a lien is granted on the de-allocated portion of the corpus allocation of a given loan.

6. The method of claim 5, wherein the lien is superior to the availability of the de-allocated portion of the corpus allocation to meet the limited recourse general obligation.

7. The method of claim 1, wherein the earnings from the corpus allocation corresponding to the given loan are paid to the borrower on a periodic basis.

8. The method of claim 7, wherein a periodic payment of the earnings from the corpus allocation corresponding to the given loan is made to the borrower after a loan payment associated with the given loan is due.

9. The method of claim 8, wherein the periodic payment of earnings from the corpus allocation corresponding to the given loan is made to the borrower regardless of whether the loan payment associated with the given loan is actually made.

10. The method of claim 1, wherein the earnings from the corpus allocation corresponding to the given loan are paid to the borrower in advance.

11. The method of claim 10, wherein the earnings from the corpus allocation corresponding to the given loan are paid to the borrower in advance in an amount substantially equal to a present value of the expected earnings.

12. The method of claim 11, wherein the present value of the expected earnings is calculated using an expected yield.

13. The method of claim 1, wherein the state revolving fund bond program is structured in connection with an initial financing.

14. The method of claim 1, wherein the state revolving fund bond program is structured in connection with a refunding.

* * * * *